Nov. 3, 1953  E. L. LAUNDER ET AL  2,657,482
REMOVABLE POINT LOCKING MECHANISM FOR DIGGING TEETH
Filed Aug. 21, 1946
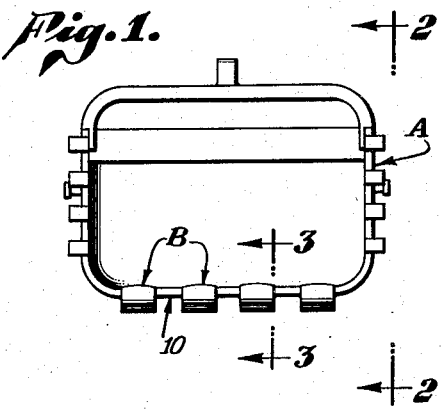
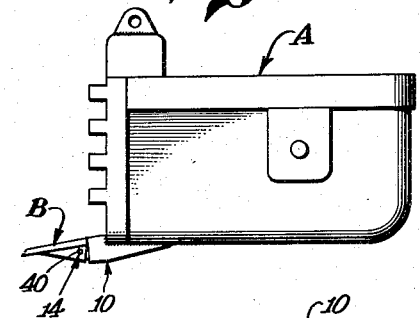
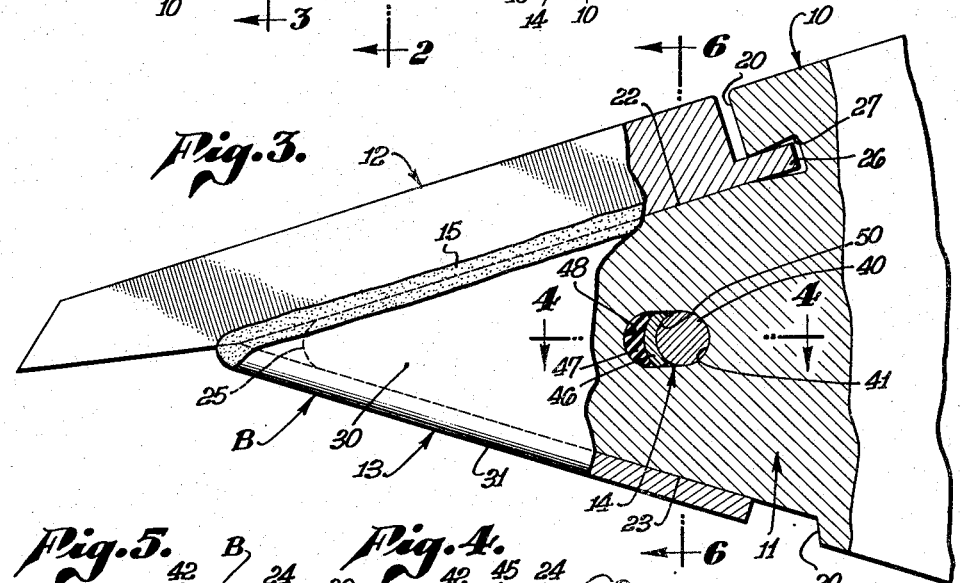
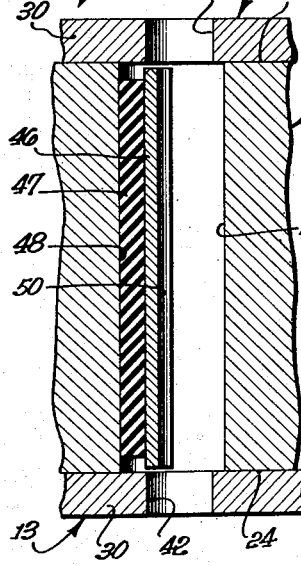
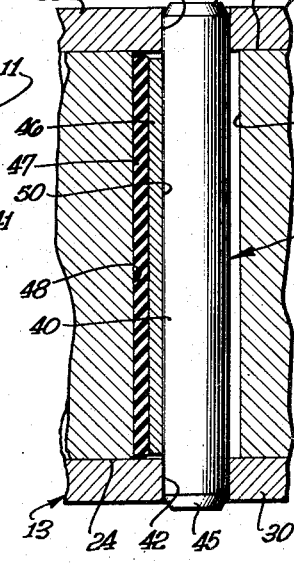
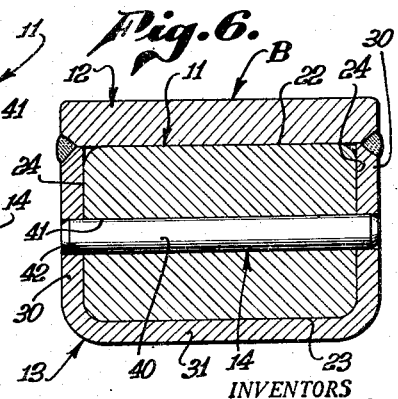
INVENTORS
Ernie L. Launder
BY Chester C. Hosmer
ATTORNEY Patented Nov. 3, 1953

2,657,482

UNITED STATES PATENT OFFICE 2,657,482

REMOVABLE POINT LOCKING MECHANISM FOR DIGGING TEETH

Ernie L. Launder, Montebello, and Chester C. Hosmer, Long Beach, Calif.

Application August 21, 1946, Serial No. 691,976

9 Claims. (Cl. 37—142)

This invention relates to a capped digger tooth and it is a general object of the invention to provide a construction for a digger tooth or the like involving a practical, dependable retaining means holding parts such as a cap and tooth together.

There are various situations where parts are releasably or detachably connected and where the circumstances are such as to require a simple, practical, inexpensive and yet dependable fastening device. One such situation is where a cap is applied to and is to be retained on a digger tooth. In the following disclosure we will refer specifically to the invention as applied to a tooth and cap construction whereas it is to be understood that the broader principles of the invention can be applied to advantage in various situations where the parts are analogous to a tooth and cap.

A general object of the present invention is to provide a construction involving two parts such as a tooth and cap and a retainer which is simple and inexpensive of manufacture and which is very easy both to apply and to remove. With the retainer that we have provided when it is desired to connect the parts it is merely necessary to drive the pin in place and when it is desired to disconnect the parts the pin can be driven out of place by any simple implement such as a punch, or the like.

It is a further object of the present invention to provide a construction of the general character referred to which is entirely free of complicated locking devices or parts requiring manipulation or operation and which are subject to working loose or to failure. With the construction of the present invention a frictional grip is established to hold the pin in place and this grip is such that the pin will remain securely and dependably in place until it is deliberately removed.

The various objects and features of our invention will be fully understood from the following detailed description of a typical preferred form and application of the invention, throughout which description reference is made to the accompanying drawings, in which:

Fig. 1 is a front elevation of a bucket shown equipped with a plurality of teeth embodying the present invention. Fig. 2 is a side elevation of the bucket, being a view taken substantially as indicated by line 2—2 on Fig. 1. Fig. 3 is an enlarged side view of one of the teeth of the bucket with certain of the parts broken away to show in section, being a view taken substantially as indicated by line 3—3 on Fig. 1. Fig. 4 is a detailed transverse sectional view taken as indicated by line 4—4 on Fig. 3, showing the retaining pin in place. Fig. 5 is a sectional view taken the same as Fig. 4 except that the retaining pin is removed. Fig. 6 is a reduced transverse sectional view taken as indicated by line 6—6 on Fig. 3.

In the drawings we have shown a typical bucket A of the type commonly equipped with digger teeth B and we have shown a type of digger tooth construction wherein the tooth is provided with a detachable or removable cap. The present invention is concerned primarily with the combined tooth, cap and retaining means provided to retain the cap on the tooth. In the drawings we illustrate what may be an adapter or a base 10 which is on or which forms a part of the bucket A. A nose piece or tooth 11 projects forward from the base A and carries the tooth point or cap which includes a body 12 and a housing 13. The retaining pins 14 of the present invention releasably secure or retain the cap to the tooth.

The base 10 in the case illustrated is provided at the forward edge portion or lip of the bucket A and it is provided with a forward or front face 20. The tooth 11 is shown as an integral extension or continuation of the base 10 and projects forward from the face 20. The tooth is a tapered structure or element involving convergent top and bottom faces 22 and 23, respectively, and it has spaced parallel side walls 24 that extend between the top and bottom. The top and bottom 22 and 23 are pitched or converge so that they come together to form a tooth tip 25.

The tooth cap may in practice be formed or constructed in any suitable manner. In the case illustrated we show a fabricated or built up cap construction involving the body 12 and housing 13. In this case the body 12 of the cap is a heavy wear resisting element or spike which bears on the top 22 of the tooth and projects forward from the face 20 of the base to the tip 25 of the tooth. The forward end portion of the body 12 is shaped or dressed to have the desired digging or cutting action. In the particular case illustrated a tongue 26 is provided on the inner end of the body 12 to extend into a socket 27 provided in the face 20.

The housing 13 of the cap may be of lighter construction than the body and may be secured to the body as by welds. The housing involves spaced sides 30 which engage or overlie the sides 24 of the tooth, and a bottom 31 which engages or fits against the bottom 23 of the tooth. The sides 30 of the housing are triangular in shape and the body 12 and bottom 31 which are joined thereto are angularly related to correspond to the angle or pitch of the tooth 11. The parts are preferably related and proportioned so that the housing and body of the cap form a socket into which the tooth fits in the manner shown throughout the drawings.

The retaining means 14 involves, primarily, a pin 40 held in a transverse passage 41 provided in the tooth so that it has end portions extending into or carried in openings 42 provided in the sides 30 of the cap or housing 13.

The pin 40 is preferably a simple, elongate member round in cross section and made sufficiently long to extend completely through the tooth and the sides 30 of the cap construction, so that its ends are substantially flush with the outer surfaces of the sides 30. It is to be understood, however, that the pin may be made somewhat shorter or longer, as circumstances may require. In the preferred construction the ends 45 of the pin are somewhat beveled or dressed off to facilitate insertion of the pin into place, as will be hereinafter described.

In addition to the pin 40 the means 14 involves a grip member or shoe 46 carried in the passage provided through the tooth and a resilient element 47 that backs up or bears upon the shoe to normally force it into pressure engagement with the pin when the pin is in operating position, as shown in Figs. 3, 4 and 6 of the drawings. The passage 41 through the tooth 11 extends transversely through the tooth from one side 24 to the other, and instead of being a simple round opening or bore it is somewhat elongated or extended at 48 toward the front of the tooth to accommodate or carry the shoe 46 and the resilient element 47.

The shoe 46 is co-extensive with the opening or passage through the tooth, that is, it preferably extends from one side of the tooth to the other, and it is preferably formed with a concave gripping face 50 which fits or conforms to the exterior of the pin 40 to have the extensive bearing engagement therewith. In practice it is desirable to make the shoe as large as possible, consistent with the location in which it is employed, and it may be formed or shaped in various manners. In the case illustrated we have shown a shoe formed of a length or strip of sheet material such as sheet metal shaped or formed so that its face 50 has the desired contour to fit the pin 40.

In carrying out the invention no particular finish or features of construction need be employed to establish the desired frictional engagement between the pin and shoe. However, if desired or if circumstances require the exterior of the pin may be partially or wholly roughened as by knurling and the face 50 of the shoe can be correspondingly finished, with the result that a very substantial degree of finish or a marked locking action is obtained between the shoe and pin.

The member 47 provided in the retaining means is a yielding member and in practice may be a spring-like member. However, it is preferred that it be in the form of a body or bodies of rubber-like material arranged between the back or outer side of the shoe 46 and the bottom of the extension 48 of the passage 41 which carries the pin 40. In practice we may employ a simple strip or length of rubber or rubber-like material arranged in the passage 41 behind the shoe either to conform to the space between the back of the shoe and the bottom of the passage extension 48 or substantially conform thereto.

It is preferred that the shoe and the resilient member be proportioned and related so that when the member 47 is in its normal position it supports the shoe in a manner to project into the passage rendering the space left for the pin too small to readily receive or pass the pin. It is a feature of the invention that the parts be thus related so that when the pin is applied it must be driven or forced into place in the course of which operation the shoe is forced toward the bottom of the passage extension 48 putting the element 47 under pressure, with the result that the member 47 urges the shoe toward the pin and thus creates a substantial grip or frictional engagement between the shoe and the pin. In practice the member 47 may be made narrower in width and/or shorter in length than the shoe 46 in order to allow room for expansion of the member when the pin 40 is applied.

In the case of a tooth and tooth cap such as we have illustrated the tooth and cap are not always made to accurately fit together, but it is preferred to make them so that slight imperfections or misfits result in the cap being slightly forward on the tooth prior to the retaining pin being driven into place, so that it is necessary to force the cap back onto the tooth in the course of applying the pin. This operation occurs simultaneously with the application of pressure to the shoe in a manner to apply pressure to the member 47. A typical initial relationship of parts is illustrated in Fig. 5 from which it will be apparent that as the pin is driven into the position shown in Fig. 4 it must force the cap rearward on the tooth at the same time that it compresses the shoe against the resilient element 47.

By providing the pin with slightly tapered ends 45 the starting of the pin is made easy. When the pin is driven into place, as shown in Figs. 4 and 6, the end portions thereof fitting or bearing in the openings 42 provided in the sides 30 of the cap construction effectively retain the cap on the tooth. The metal parts of the pin may be slightly resilient in which case they may be somewhat deflected or bent when in place. It will be apparent that application of the pin is effected by driving or pressure and that its removal can be effected in the same manner, that is, it is merely necessary to drive it out of place when it is desired to remove the cap from the tooth.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. In combination, an elongate tooth having a transverse elongate passage extending through it, a cap over the tooth and having openings in spaced parts and registering with ends of said passage, a pin carried in the passage and extending through the tooth with its ends extending into the openings in the cap and bearing against the cap in one direction only longitudinally of the tooth, and means in the passage bearing laterally on the pin at one side only thereof holding the pin against displacement from the tooth and cap and including an elongate shoe extending through the passage from one end to the other thereof and parallel with the pin and bearing against one side only of the passage.

2. In combination, an elongate tooth having a transverse elongate passage extending through it and being of substantially uniform size and shape from one end to the other, a cap over the tooth and having openings in opposite spaced parts and registering with ends of said passage, a pin located in the passage to be completely surrounded by the tooth and having its ends projecting in opposite directions from the tooth and into the openings in the cap, both ends of the pin bearing against the cap in one direction only longitudinally of the tooth, the pin being substantially uniform in size and shape throughout the portion thereof that is within the tooth, and means in the passage bearing laterally on one side only of the pin holding the pin against displacement from the tooth and cap including an elongate pressure shoe with a gripping face conforming in shape and length to the exterior of the portion of the pin that is in the passage.

3. In combination, an elongate tooth having a transverse elongate passage extending completely through it, a cap over the tooth and having opposite spaced parts overlying the tooth and having openings registering with the ends of the passage in the tooth, a pin round in cross section throughout its length and carried in the passage through the tooth with its ends in the openings in the cap and each bearing in one direction only against the cap and longitudinally of the tooth, and means in the passage bearing laterally on the pin and in the opposite direction longitudinally of the tooth holding the pin against displacement from the tooth and cap including, an elongate shoe extending continuously from one end of the passage to the other and engaging the pin at one side only and a resilient member holding the shoe against the pin.

4. In combination, an elongate tooth having a transverse passage extending continuously through it, a cap over the tooth and having spaced parts disposed longitudinally of the tooth and overlying the tooth and having openings transverse of the tooth and registering with the ends of the passage in the tooth, a pin carried in the passage through the tooth with its ends in the openings in the cap and each bearing against the cap in one direction only longitudinally of the tooth, the pin being uniform in size and shape throughout the portion within the passage, and means in the passage bearing laterally on the pin and in the opposite direction longitudinally of the tooth and holding the pin against displacement from the tooth and cap, said means including, an elongate rigid shoe uniform in size and shape throughout its length and extending from one end of the passage to the other and engaging one side only of the pin and an elongate resilient member in the passage behind the shoe holding the shoe against the pin.

5. In combination, an elongate tooth having a transverse passage extending continuously through it, a cap over the tooth and having spaced parts extending longitudinally of the tooth and overlying the tooth and having openings registering with the ends of the passage in the tooth, a rigid pin carried in the passage through the tooth with its ends in the openings in the cap and each bearing against the cap in one direction only longitudinally of the tooth, the pin being round in cross section throughout the passage, and means in the passage bearing laterally on the pin holding it against displacement from the tooth and cap including, an elongate pressure shoe with a gripping face extending from one end to the other of the shoe conforming to the exterior of the pin in the passage and an elongate resilient member in the passage holding the shoe in pressure engagement with the pin.

6. In combination, an elongate tooth having a passage extending continuously through it, a cap over the tooth and having spaced parts extending longitudinally of the tooth and overlying the tooth and having openings registering with the ends of the passage in the tooth, a solid pin carried in the passage through the tooth with its ends in the openings in the cap and each bearing against the cap in one direction only longitudinally of the tooth, the pin being round in cross section throughout the passage, and means in the passage bearing laterally on the pin in the opposite direction longitudinally of the tooth and holding the pin against displacement from the tooth and cap including, an elongate rigid pressure shoe extending from one end of the passage to the other and having a gripping face extending uniformly from one end to the other of the shoe and having an inner side conforming to the exterior of the pin in the passage and an elongate resilient member behind the shoe engaging the outer side thereof and holding the shoe against the pin and bearing against the wall of the passage.

7. In combination, an elongate tooth having a passage extending transversely and continuously through it and spaced from its top and from its bottom, a cap over the tooth and having spaced parts extending longitudinally of the tooth and overlying the tooth and having openings registering with the ends of the passage in the tooth, a solid rigid uniform pin carried in the passage through the tooth with its ends in the openings in the cap and both bearing against the cap in one direction longitudinally of the tooth, and means in the passage bearing on the pin laterally in the opposite direction longitudinally of the tooth and holding the pin against displacement from the tooth and cap including, an elongate rigid shoe engaging one side only of the pin and an elongate resilient member coextensive with the shoe and holding the shoe against the pin, the passage being extended laterally of its longitudinal axis and longitudinally of the tooth to accommodate the shoe and said member and being uniform in cross section throughout its length.

8. In combination, an elongate tooth having a passage exending continuously and transversely through it from one side of the tooth to the other and spaced from the top and bottom of the tooth, a cap over the tooth and having spaced side parts overlying the tooth and having openings registering with the ends of the passage in the tooth, a solid pin round and uniform throughout its length and carried in the passage through the tooth with its ends in the openings in the cap and both bearing against the cap in one direction longitudinally of the tooth, and means in the passage bearing laterally in the opposite direction on the pin holding the pin against displacement from the tooth and cap including, an elongate rigid shoe extending from one end of the passage to the other and engaging the pin at one side only thereof and an elongate body of rubber-like material substantially coextensive with the shoe and holding the shoe against the pin, the passage being uniform in cross section throughout its length.

9. In combination, an elongate tooth having a passage extending continuously through it from one side to the other, a cap over the tooth and having spaced side parts overlying the tooth and having openings registering with the ends of the passage in the tooth, a solid pin round in cross section throughout its length and carried in the passage through the tooth with its ends in the openings in the cap and each bearing against the cap in one direction only longitudinally of the tooth, an elongate shoe in the passage extending from one end to the other thereof and having a gripping face curved to conform to and bearing laterally on the exterior of the pin at one side thereof, and a body of rubber-like material behind the shoe throughout its length yieldingly urging the shoe into pressure engagement with the pin, the passage in the tooth being extended toward the front of the tooth to accommodate the shoe and said body.

ERNIE L. LAUNDER.
CHESTER C. HOSMER.

References Cited in the file of this patent

UNITED STATES PATENTS

| Number | Name | Date |
|---|---|---|
| 1,419,891 | Oakes | June 13, 1922 |
| 1,753,392 | Van Buskirk | Apr. 8, 1930 |
| 1,856,930 | Robin | May 3, 1932 |
| 2,259,456 | Crawford | Oct. 21, 1941 |
| 2,312,802 | Crawford | Mar. 2, 1943 |
| 2,427,651 | Baer | Sept. 23, 1947 |
| 2,435,847 | Robertson | Feb. 10, 1948 |

FOREIGN PATENTS

| Number | Country | Date |
|---|---|---|
| 18,543 | Great Britain | Nov. 13, 1897 |